(No Model.)
F. DÜHRKOP.
MACHINE FOR MIXING DOUGH.
No. 540,962. Patented June 11, 1895.
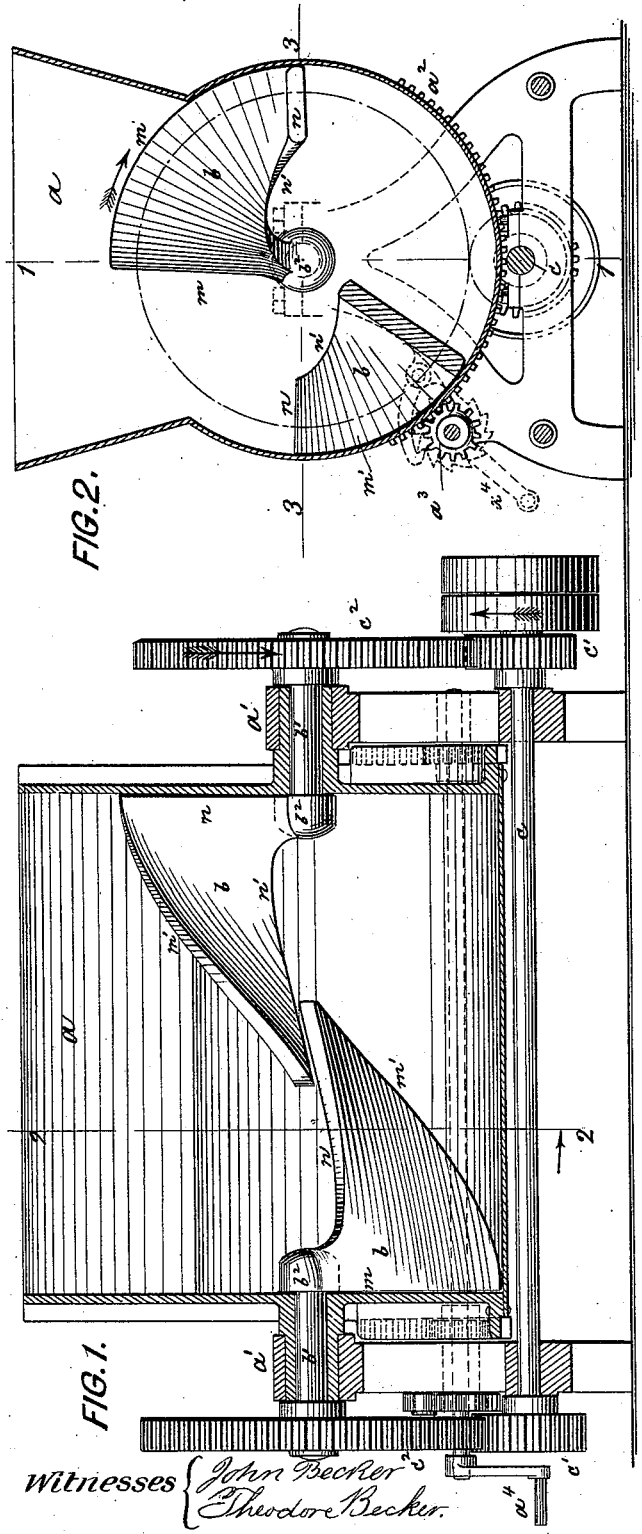

UNITED STATES PATENT OFFICE.

FRITZ DÜHRKOP, OF NEW YORK, N. Y.

MACHINE FOR MIXING DOUGH.

SPECIFICATION forming part of Letters Patent No. 540,962, dated June 11, 1895.

Application filed November 5, 1894. Serial No. 527,871. (No model.)

*To all whom it may concern:*

Be it known that I, FRITZ DÜHRKOP, of New York city, New York, have invented a new and useful Improvement in Machines for Mixing Dough, of which the following is a specification.

This invention relates to a dough mixing machine which is so constructed that the dough is thoroughly agitated or mixed by a pair of independent and coacting blades.

In the accompanying drawings, Figure 1 is a vertical longitudinal section of my improved dough-mixing machine on line 1 1, Fig. 2. Fig. 2 is a vertical cross-section on line 2 2, Fig. 1. Fig. 3 is a horizontal section on line 3 3, Fig. 2; and Fig. 4 is a plan of the mixing-blades, showing them laid out in a plane.

The letter $a$, represents the mixing vessel or hopper, hung by hubs $a'$, on the shafts $b'$, of the blades $b$. The hopper $a$, may be tilted by means of the curved rack $a^2$, pinion $a^3$, and crank handle $a^4$, for the removal of the dough as usual. The shafts $b'$, are revolved in the same direction from driving shaft $c$, by means of gearing $c'$, $c^2$, or otherwise. To the inner end of each shaft $b'$, there is secured a mixing blade $b$, which is disconnected from, but adapted to co-operate with the other symmetric mixing blade. The blades are of such a length that they overlap at their inner ends, while they are so connected to their shafts, that they always face each other. Each blade tapers toward its inner end, and its body is made with a short spiral twist, while it is cut away in front of its hub $b^2$, so as not to have a dead surface. When the blade is laid out into a plane (Fig. 4), it has two sides $m$, $m'$, joined at right angles, and two sides $n$, $n'$, joined by an obtuse angle as shown.

In operation, the blades act upon the dough in a novel and effective manner. When a blade arrives at its lowermost position, it will scoop up the dough, and owing to its spiral shape will throw it toward the center of the hopper, as the blade gradually rises. When it has arrived at its uppermost position, the blade will release the dough and cause it to drop upon the second blade and also in part upon the bottom of the hopper. That part of the dough which has been caught by the second blade, will, owing to the spiral form of the latter, be worked toward its outer or enlarged end, to be eventually dropped. The dropped dough will upon the next descent of the second blade be again picked up and conveyed to the first blade, and thus both blades will continually move and interchange their loads. That the dough is thus thoroughly agitated and all its parts properly moved and intermixed is clear.

A great advantage of this machine, aside from its efficiency is that the blades can be made solid, in contradistinction to the one continuous open work blade now generally used and through which the dough must fall. The objection to this latter construction is that the blades are very difficult to clean and that the dough hangs upon all its numerous edges, while my blades remain bright and clean and can, if necessary, be readily polished.

What I claim is—

A dough mixing machine provided with a pair of disconnected symmetric spiral blades which face each other, and have overlapping inner reduced ends, whereby the dough is interchanged between the blades, substantially as specified.

FRITZ DÜHRKOP.

Witnesses:
 WILLIAM SCHULZ,
 F. V. BRIESEN.